United States Patent
Olson et al.

(10) Patent No.: US 9,893,972 B1
(45) Date of Patent: Feb. 13, 2018

(54) MANAGING I/O REQUESTS

(71) Applicant: Amazon Technologies, Inc., Seattle, WA (US)

(72) Inventors: Marc Stephen Olson, Bellevue, WA (US); Jeevan Shankar, Amherst, MA (US); James Michael Thompson, Seattle, WA (US); Danny Wei, Seattle, WA (US); John Robert Smiley, Issaquah, WA (US); John Luther Guthrie, II, Bellevue, WA (US); Nachiappan Arumugam, Seattle, WA (US); Benjamin Arthur Hawks, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 269 days.

(21) Appl. No.: 14/571,223

(22) Filed: Dec. 15, 2014

(51) Int. Cl.
*G06F 15/16* (2006.01)
*H04L 12/26* (2006.01)
*H04L 29/08* (2006.01)

(52) U.S. Cl.
CPC .......... *H04L 43/0876* (2013.01); *H04L 67/10* (2013.01)

(58) Field of Classification Search
CPC ......... H04L 67/10; H04L 67/12; H04L 63/08; H04L 67/18; H04L 67/02; H04L 63/104; H04L 63/0853; H04L 63/0876; H04L 63/0884; H04L 67/306; H04L 67/32; G06Q 10/0833; G06Q 10/0832; G06Q 10/0835; G06Q 10/0836; G06Q 10/087
See application file for complete search history.

(56) References Cited

U.S. PATENT DOCUMENTS

| | | | |
|---|---|---|---|
| 5,651,111 | A | 7/1997 | McKeeman et al. |
| 7,080,351 | B1 | 7/2006 | Kirkpatrick et al. |
| 7,437,712 | B1 | 10/2008 | Brown et al. |
| 7,568,183 | B1 | 7/2009 | Hardy et al. |
| 8,060,585 | B2 | 11/2011 | Waud et al. |

(Continued)

OTHER PUBLICATIONS

Allen, L., et al., Clearcase Multisite: Supporting Geographically-Distributed Software Development, 1995, pp. 194-214.

(Continued)

*Primary Examiner* — Tauqir Hussain
*Assistant Examiner* — Thao Duong
(74) *Attorney, Agent, or Firm* — Knobbe, Martens, Olsen & Bear, LLP

(57) ABSTRACT

Systems and methods are described providing detailed input/output (I/O) metric information that is collected and gathered by an agent of the storage volume. An I/O request is received by a storage volume, and the agent associates primary and secondary identifiers with that I/O request. For example, a trace may be associated with that I/O request. The agent may store this I/O metric information in a ring buffer. Further, after collection and aggregation, statistics may be published by an I/O metric service that further processes the data provided by the agent. Advantageously, interdependent relationships associated with the I/O request or I/O operations of that request may be included in those statistics. This may allow an operator to evaluate the performance of I/O requests for a network.

23 Claims, 5 Drawing Sheets

(56) References Cited

U.S. PATENT DOCUMENTS

| | | | |
|---|---|---|---|
| 8,161,212 B1* | 4/2012 | Lu | G06F 13/1684 710/20 |
| 8,176,483 B2 | 5/2012 | Hoefler et al. | |
| 8,225,281 B1 | 7/2012 | Hardinger et al. | |
| 8,490,084 B1 | 7/2013 | Alford et al. | |
| 8,677,315 B1 | 3/2014 | Anderson et al. | |
| 9,454,351 B2 | 9/2016 | Anderson et al. | |
| 2003/0182652 A1 | 9/2003 | Custodio | |
| 2004/0261053 A1 | 12/2004 | Dougherty et al. | |
| 2004/0261070 A1 | 12/2004 | Miller et al. | |
| 2005/0015762 A1 | 1/2005 | Steckler et al. | |
| 2005/0044162 A1* | 2/2005 | Liang | G06F 17/30067 709/212 |
| 2005/0044531 A1 | 2/2005 | Chawla et al. | |
| 2005/0108685 A1 | 5/2005 | Ta | |
| 2005/0114829 A1 | 5/2005 | Robin et al. | |
| 2006/0212857 A1 | 9/2006 | Neumann et al. | |
| 2006/0248522 A1 | 11/2006 | Lakshminarayanan et al. | |
| 2007/0006122 A1 | 1/2007 | Bailey et al. | |
| 2007/0061782 A1 | 3/2007 | Schreiner et al. | |
| 2007/0083859 A1 | 4/2007 | Fussell et al. | |
| 2007/0234116 A1 | 10/2007 | Bayerlein | |
| 2008/0098385 A1 | 4/2008 | Alger | |
| 2008/0114859 A1* | 5/2008 | Orzen | H04H 20/24 709/218 |
| 2008/0235075 A1* | 9/2008 | Couture | G06F 11/3495 709/224 |
| 2009/0019420 A1 | 1/2009 | Johnson | |
| 2009/0070734 A1 | 3/2009 | Dixon et al. | |
| 2009/0313625 A1* | 12/2009 | Sharoff | G06F 11/3414 718/100 |
| 2010/0058294 A1 | 3/2010 | Best et al. | |
| 2010/0088498 A1 | 4/2010 | Kreek et al. | |
| 2010/0162226 A1 | 6/2010 | Borissov | |
| 2010/0235807 A1 | 9/2010 | Doddappa et al. | |
| 2010/0287547 A1 | 11/2010 | Korkishko | |
| 2011/0029963 A1 | 2/2011 | Smith et al. | |
| 2011/0173591 A1 | 7/2011 | Prasad | |
| 2011/0225217 A1 | 9/2011 | Plax et al. | |
| 2011/0283253 A1 | 11/2011 | Dutta | |
| 2011/0302472 A1 | 12/2011 | Van Eikema Hommes | |
| 2012/0226804 A1* | 9/2012 | Raja | H04L 43/028 709/224 |
| 2012/0233322 A1* | 9/2012 | Baumback | G06F 9/5061 709/224 |
| 2015/0159423 A1 | 6/2015 | Fu | |

OTHER PUBLICATIONS

Costa, H.R., et al., Evaluating Software Project Portfolio Risks, The Journal of Systems and Software, vol. 80, 2006, pp. 16-30.

Durrett, B., Scaling With Continuous Deployment, PowerPoint slides from Developer Summit dated Jun. 29, 2010.

Fagan, M., Design and Code Inspection to Reduce Errors in Program Development, 1976, IBM Systems Journal 15(3):301-334, 1976.

Farley, D., The Deployment Pipeline, CruiseControl Enterprise, ThoughWorks, Inc.—ThoughtWorks Studios, copyright 2007, pp. 1-11.

Fowler, M., Continuous Integration, http://martinfowler.com/articles/continuousintegration.html, dated May 1, 2006, retrieved Oct. 6, 2011.

Levy, M., et al., Agile Knowledge Management, IGI Global, copyright 2009, pp. 112-117.

Ries, E., Continuous Deployment in 5 Easy Steps, O'Reilly Radar, htt;://radar.oreilly.com/2009/03/continuous-deployment-5-eas.html, dated Mar. 30, 2009, retrieved Oct. 5, 2011.

* cited by examiner

MANAGING I/O REQUESTS

BACKGROUND

Generally described, computing devices can utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization.

To facilitate increased utilization of data center resources, individual computing devices within a data center may be configured to provide specific functionality according to the requirements of the data center. Moreover, virtualization technologies may allow a single physical computing device to host one or more instances of a virtual machine (e.g., a virtual machine device), where the virtual machine device instance appears to a user of a data center as an independent computing device. With virtualization, the host computing device can create, maintain, delete, or otherwise manage virtual machine device instances in a dynamic manner. In turn, users can request computing resources (e.g., storage resources) from the data center, including single computing devices or a configuration of networked computing devices, and be provided with virtual machine device instances that provide the requested computing resources. Thus some hosted environments include virtual machine instances that act as computing resources for computing devices (e.g., clients). These virtual machine instances can then use storage resources in the data center.

To access these storage resources, the virtual machine instances can send input/output (I/O) requests that allow them to read and write to the storage resources. Clients can send requests to the virtual machine instances over the communications network. The virtual machine instances, in turn, can also send requests to the storage resources.

DETAILED DESCRIPTION

Figure 1:
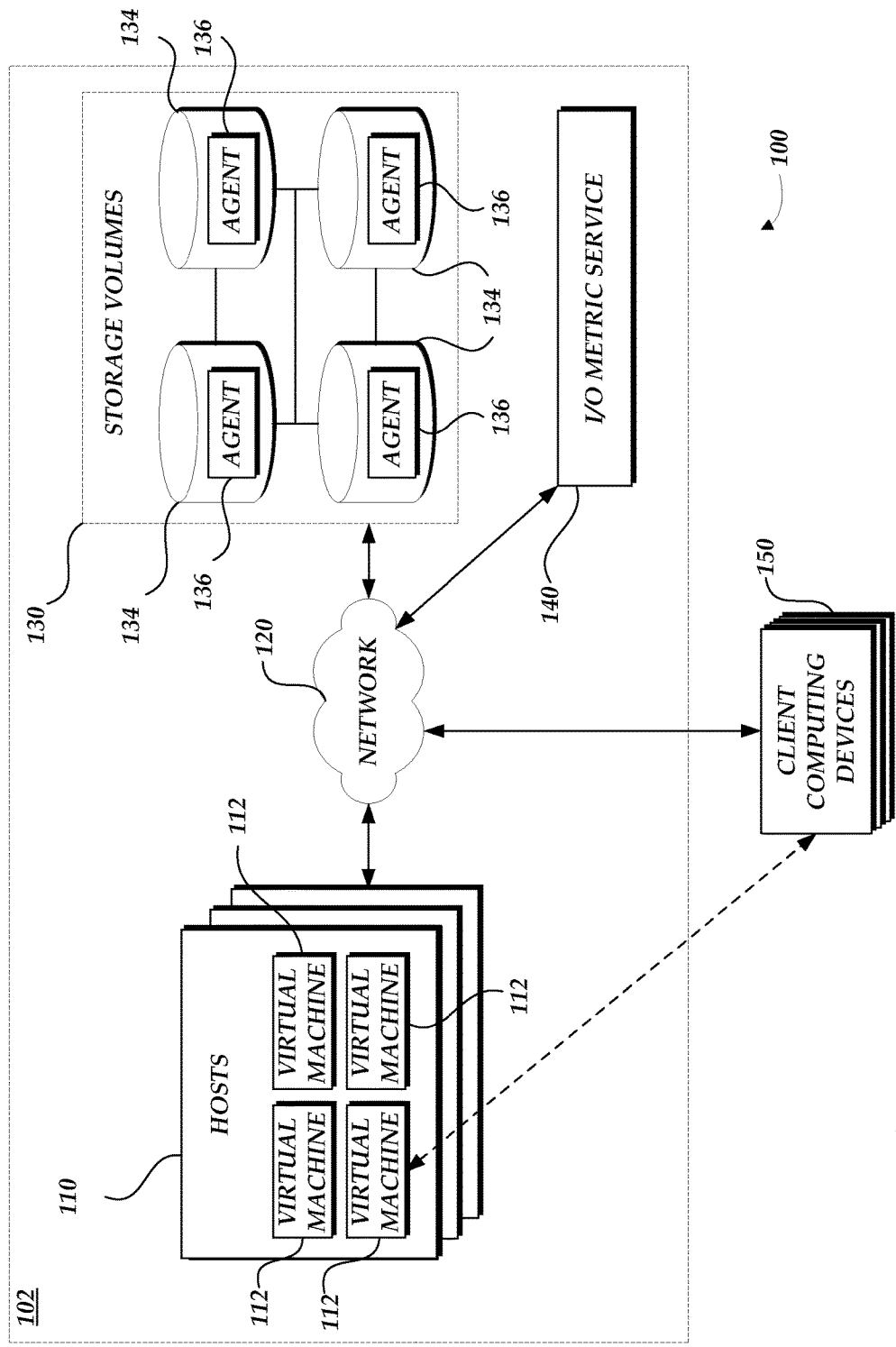
FIG. 1 is a block diagram depicting an illustrative network topology including multiple virtual machines, storage volumes, and an I/O metric service interconnected via a network.

Generally described, network-based I/O requests can take a certain path to reach the storage volume, and I/O requests can have timers associated that specify the length of an I/O operation. A data center operator hosting storage volumes receiving the I/O requests can evaluate the performance of how fast data is accessed from storage volumes by I/O requests using the path and timer data as I/O metrics to evaluate that performance. In some approaches, I/O metrics are only acquired when a client computing device sends I/O requests because this I/O metric information is communicated via a protocol used by the client computing device and storage volumes. That is, after the storage volumes process the I/O requests, any I/O metric information collected is embedded into the I/O responses as specified by the protocol. Because the protocol specifies how the I/O metric information is embedded, the flexibility in the collection of I/O metric information is limited.

More specifically, I/O metric information, in many cases, is only available to the client computing device as part of the protocol that it uses to communicate with the storage volumes. Accordingly, without a built-in metric to the protocol (e.g., within header information of a protocol packet), performance data is limited to the data transmitted within the protocol. Further, data centers with several storage volumes can contain numerous I/O requests. As one skilled in the art may recognize, adding further I/O metrics to a protocol for performance evaluation could add significant overhead to the protocol, possibly degrading performance even more. Further still, the client computing device must wait for a response to the I/O request. Thus, performance data is not available in real-time to data center operators to evaluate the performance of the storage volumes, without first requesting again from the client computing device that sent the original I/O request and receiving the response with the I/O metric information.

In other approaches, I/O metric information is gathered by a client computing device from a network data store (e.g., the storage volume processing the I/O request) via the communication protocol. However, in this approach, the I/O metric information does not bear any apparent relationship to one another or even an indication that a certain I/O metric is related to another I/O metric. But many I/O operations are related to each other, for example, a replication relationship within an I/O request can be referred to as master/slave relationship, with a master storage volume and a slave storage volume. Accordingly, an I/O replication request includes a read to a master storage volume and a write to slave storage volume. However, many I/O metrics and statistics do not indicate this replication relationship for such an I/O request. This makes performance evaluation difficult as a data center operator may not be able to take into account all the factors for performance evaluation of another I/O operation without first determining which I/O operations are related to it.

Generally described, the present disclosure relates to collecting and aggregating certain parameters and I/O metrics of I/O requests. More specifically, aspects of the present application correspond to systems, methods and computer-readable media related to the management of I/O requests by collection of various I/O metrics associated with the processing of networked-based I/O requests. Illustratively, the present application will be described with regard to the processing of I/O requests transmitted by a client computing device on a network, such as virtual machine instance operating in a hosted environment on behalf of a physical client computing device. In various embodiments, the I/O requests are transmitted to network-based storage volumes to access data for the client computing device.

In another aspect of the present disclosure, an agent of the storage volume is configured to identify relationship information based on the I/O requests. Such relationship information can include a dependency relationship of the I/O requests, for example, an I/O request to read a storage volume may then necessitate another I/O request that subsequently reads the same storage volume. In this example, the subsequent read is dependent on the initial read. With this relationship information, the agent is further configured to determine primary and secondary identifiers. For example, in some embodiments, the primary identifiers correspond generally to I/O requests. This can be referred to as a trace. The secondary identifiers correspond generally to I/O operations that are performed to accomplish those I/O requests. This can be referred to as a span. The spans that include I/O operations corresponding to the I/O requests of traces further illustrate a dependency relationship. For example, the I/O operations corresponding to several spans can depend on the I/O request (e.g., a read to a storage volume) corresponding to a certain trace. Further still, the agent is configured to determine tertiary identifiers based on the relationship information that further associate an interdependent relationship among the trace, span, and related subspans. The tertiary identifiers correspond generally to further sub-I/O operations that are performed to accomplish the I/O operations. This can be referred to as a subspan. One skilled in the relevant art will appreciate that other identifiers associated with aspects of I/O requests or various relationships may also be utilized. Accordingly, in some embodiments, identifiers may be associated with certain types of I/O requests, for example, display requests or varying client requests based on origination from a physical or virtual machine.

In some embodiments, the subspans, spans, and traces, all with self-describing formats, indicate that these I/O operations are related to one another. Accordingly, the self-describing formats of these identifiers contain relationship information. For example, in one embodiment, a span indicates that certain I/O operations are to be performed in parallel or in series (e.g., a write and a subsequent write). Accordingly, in another aspect of the present disclosure, the agent is configured to provide I/O metrics that account for these relationships so that a data center operator can observe where bottlenecks occur in I/O processing. Still further, the agent can be further configured to conduct additional processing, such as detecting outliers, prior to storing or transmitting aggregated I/O metric information.

In various embodiments of the present disclosure, the agents within the storage volume (e.g., a computer-readable medium stored with computer-executable instructions) can process numerous I/O requests using a ring buffer. As one skilled in the art will appreciate, a ring buffer is a structural allocation of data storage that functions to provide first-in, first-out (FIFO) reading and writing to that data storage, thereby buffering a data stream. In some embodiments, this structural allocation can be logical or physical within a storage volume and additionally can use pointers to index the FIFO characteristics of the ring buffer. In the various embodiments of the present disclosure, the ring buffer stores the traces, spans, and subspans available to the agent. In various embodiments, the ring buffer limits the amount of data collected and aggregated by agent.

Further still in various embodiments, the agent is configured to aggregate the I/O metrics after using the traces, spans, and subspans to collect various timers and relationship information indicating the performance of I/O operations, or I/O requests generally. Because the traces, spans, and subspans are associated with dependency relationships among the I/O operations or I/O requests, the agent aggregates detailed I/O metrics providing the relationship among various I/O operations within various storage volumes. Accordingly, in some embodiments, aggregations occur more frequently if I/O requests become numerous thus still allowing detailed I/O metrics and overall statistics to be aggregated and sent to the centralized I/O metric processing service without overwhelming the network.

In other embodiments of the present disclosure, because traces and spans regarding that path are defined with reference to that path, collected, aggregated I/O metrics are aggregated at the storage volume and stored in the ring buffer. Then, aggregated I/O metrics are obtained from the ring buffer and processed further at a centralized I/O metric processing service. The centralized I/O metric processing service determines that a certain threshold level defines whether a particular I/O request is being performed slowly at the storage volume, for example, the I/O request is performing slowly due to a slow I/O path.

In various embodiments, another hosted environment connected via the network to a slow performing storage volume can request the statistics and performance threshold from the centralized I/O metric processing service to determine whether to use the same I/O path. In other embodiments, the processed, aggregated I/O metrics can be used by a data center operator to evaluate in real-time the performance of the entire network of a data center, or even the particular performance characteristics of certain storage volumes for I/O requests. For example, the processed, aggregated I/O metrics may include summary statistics such as percentiles, which are used to determine and identify outliers.

The foregoing aspects and many of the attendant advantages will become more readily appreciated as the same become better understood by reference to the following description of illustrative embodiments, when taken in conjunction with the accompanying drawings depicting the illustrative embodiments.

FIG. 1 is a block diagram depicting an illustrative network topology 100 including multiple hosts 110 with multiple sets of client computing devices 150 that communicate with the virtual machines 112 via network 120. Illustratively, the client computing devices 150 communicate via network 120 to virtual machines 112. Client computing devices 150 use virtual machines 112 to access storage volumes 134 via network 120. Accordingly, storage volumes 134 are provisioned for attachment to virtual machines 112 as storage resources for client computing devices 150.

Client computing devices 150 may generally include any computing device receiving the storage services provisioned through virtual machines 112 to the storage volume network 130. While the term "client" is used in reference to client computing devices 150, client computing devices 150 should not be construed as limited to end user computing devices. Rather, client computing devices 150 may include end user devices, devices owned or operated by other service providers, or devices owned or operated by an administrator of hosts 110 (e.g., a data center operator). Examples of client computing devices 150 include, but are not limited to, laptops, personal computers, tablet computers, personal digital assistants (PDAs), hybrid PDA/mobile phones, mobile phones, electronic book readers, digital media players, wearable computing devices, integrated components for inclusion in computing devices, appliances, electronic devices for inclusion in vehicles or machinery, gaming devices, set top boxes, electronic devices for inclusion in televisions, and the like.

The network topology 100 further includes a network 120 operable to enable communication between the hosts 110, storage volume network 130 with storage volumes 134, client computing devices 150, and the I/O metric service 140. The network 120 may be, for instance, a wide area network (WAN), a local area network (LAN), or a global communications network.

The illustrated network topology 100 further includes a number of storage volumes 134 in a storage volume network 130. Generally, a storage volume 134 may correspond to a hard disk drive, network accessible storage, or any other type of perpetual or substantially perpetual storage accessible by one or more of the client computing devices 150. For example, the storage volumes 134 of FIG. 1 may correspond to network accessible storage devices. Though depicted as external to client computing devices 150, in some embodiments, storage volumes 134 may be internal to a specific client computing device 150.

When virtual machines 112 access storage for certain objects or files (e.g., data stores, file stores, or object stores), statistics at the client computing devices 150 can be collected regarding I/O requests that the virtual machines 112 send to storage volume network 130 via the network 120. However, a protocol that provides for such statistics may make the operation of the data center network 120 perform slowly or degrade, as it services the I/O metric requests of the client computing devices 150. Instead, the I/O metric service 140 may publish statistics regarding the storage volume network 130 that the agents 136 initially collect and aggregate as I/O metric information. This approach may thereby avoid some of the disadvantages of using a protocol to communicate I/O metrics or statistics to the client computing devices 150 over network 120.

The storage volumes 134 of the storage volume network 130 contain the agents 136 that are configured to collect I/O metrics regarding I/O requests, process the I/O requests, and subsequently aggregate the I/O metrics. More specifically, the agents 136 collect and aggregate I/O metrics regarding I/O requests from the virtual machines 112 accessing storage volumes 134. The storage volume network 130 may then provide these I/O metrics, in some embodiments stored in a ring buffer, to the I/O metric service 140 for further statistics processing. In one embodiment, a host 110 may include a single computing device (e.g., a server). Similarly, the storage volume network 130 may include a single computing device (e.g., a storage server). In another embodiment, a host 110 may include multiple computing devices in communication with one another, collectively providing a service to the client computing devices 150. And again similarly, the storage volume network 130 contains several storage volumes 134, existing as physical devices and communicating over a network to each other. A hosted computing environment of the host 110 may also be referred to as a cloud computing environment. Further, in other embodiments that are not illustratively depicted in FIG. 1, the agents 136 may reside on one of the hosts 110, across several hosts of hosts 110, or even independently operating hosts within the data center network 102. In some embodiments, the agents 136 may reside, instead, on the I/O metric service 140. As one skilled in the art may recognize, the agents 136 can be configured to operate on any network entity associated with network 120. For example, agents 136 may be configured to operate on a single computing device (e.g., a storage server) or several multiple computing devices in communication with one another.

Illustratively, the agents 136 collect and aggregate I/O metrics of I/O requests sent to storage volume network 130 by virtual machines 112. Because agents 136 aggregate statistics where the I/O requests are being processed, real-time I/O metrics may be provided locally to an operator of storage volume network 130, or more generally, an operator of data center network 102. Further, these I/O metrics are more detailed than any aggregated I/O metrics provided over the network 120 to client computing devices 150, which may not have a protocol that provides for detailed I/O metrics of the I/O operations processed at the storage volumes 134. Accordingly, a local "dump" of detailed I/O metrics can be provided to an operator evaluating the performance of the storage volume network 130. Further still, these detailed I/O metrics can be used to detect outliers. For example, the I/O metric service 140 may identify as outliers any I/O requests that are taking more than a predetermined duration to complete.

Still referring to FIG. 1, the storage volume network 130 stores these I/O metrics in a ring buffer within the storage volume network 130 using primary and secondary identifiers to identify these I/O metrics and further aggregate them. In some embodiments, these primary and secondary identifiers may be referred to as traces and spans respectively. These primary and secondary identifiers may associate the relationship among I/O operations performed for an I/O request—or even the relationship among several I/O operations for a set of I/O requests. In other embodiments, tertiary identifiers, which may be referred to as subspans, may further collect and aggregate I/O metrics of storage volume network 130, with these tertiary identifiers further associating a dependent relationship among the I/O operations.

In various other embodiments of the illustrative network topology 100, the agents 136 are configured to provide I/O metrics collected and aggregated from various entity perspectives. Upstream and downstream dependencies may be captured (e.g., collected and aggregated by agent 136) with the primary and secondary identifiers associating I/O requests with certain relationship information. This may occur, for example, even viewed from the perspective of a client computing device 150. In one embodiment, spans are associated with the receiving end of the I/O request, that is, a client computing device 150 has spans associated with the response from its initial I/O request. With this approach, an agent at client computing device 150 collects and aggregates I/O metrics to be forwarded to I/O metric service 140. With both I/O metrics from the storage volumes 134 and the client computing device 150, I/O metric service 140 processes statistics to intertwine the I/O metrics from both entities and understand the relationship of the I/O request with the I/O request's resulting downstream behavior at the storage volumes 134. Spans also can be associated with a hosted environment, or as to the host 110 and individual virtual machine instances 112. From this perspective agents can use spans to collect and aggregate I/O metrics from all associated entities of the data center network 102, including the storage volumes 134, the client computing devices 150, and any virtual machine instances 112 providing storage resources for a client computing device 150.

Still further, in some embodiments, traces and spans can be associated with the performance of network 120 so that the I/O request behavior within network 120 also is tracked. I/O metrics from all entities and the interdependent relationships indicated by the primary, secondary, and tertiary identifiers may be processed further in the I/O metric service 140 for further analysis and evaluation of the entire performance of the storage volumes 134 and I/O requests generally within the network topology 100. This approach may allow statistics to be determined for networks with high-volume transaction rates (e.g., I/O requests) so that more detailed and real-time data may be processed at the I/O metric service 140, without the overhead of existing statistics collection at a client computing device 150.

The illustrated network topology 100 further includes the I/O metric service 140 within the data center network 102. The I/O metric service 140 communicates with the individual storage volumes 134 or the storage volume network 130. Generally, the I/O metric service 140 can correspond to a hard disk drive, network accessible storage, or any other type of perpetual or substantially perpetual storage accessible by one or more of the client computing devices 150. For example, the I/O metric service 140 of FIG. 1, in some embodiments, corresponds to a network accessible storage server. In some embodiments, the I/O metric service is viewed as a centralized statistics service specifically for the storage volume network 130. Accordingly, in some embodiments, the I/O metric service 140 can be referred to as a centralized I/O metric service. In such embodiments that are not illustratively depicted, the I/O metric service 140 can be configured to operate on any network entity associated with the network 120. For example, the I/O metric service 140 can be configured to operate on a single computing device (e.g., a storage server) or several multiple computing devices in communication with one another.

In various embodiments, the I/O metric service 140 obtains from the ring buffer within the storage volume network 130 the aggregated I/O metric information via network 120. After receiving the aggregated I/O metric information, the I/O metric service 140 further processes the I/O metrics into statistics, for example, determining a performance threshold. With these threshold statistics, the I/O metric service 140 determines and/or detects outliers among certain I/O operations are performing slowly; for example, the path taken by an I/O request is congested, or a certain I/O operation is taking more time than other similar I/O operations. The I/O metric service 140 publishes this processed, aggregated I/O metric information (e.g., overall statistics). In various embodiments, the I/O metric service 140 may be viewed as making accessible this processed, aggregated I/O metric information to any network entity within the network 120. For example, client computing device 150 or the virtual machine instance 112 requests the overall statistics of a certain storage volume 134 or even the performance of storage volume network 130 at a certain time of day. Components and attributes of the I/O metric service 140 are further described below with respect to FIG. 2.

In various embodiments of the illustrative network topology 100, the I/O metric service 140 of FIG. 1 is configured to provide processed, aggregated I/O metrics that are sent in as a frequency distribution to the I/O metric service 140 for overall aggregate statistics of a storage volume network 130 or even the data center network 102. The agents 136 provide detailed statistics that are also available via the primary and secondary identifiers using the ring buffer to provide real-time, close to real-time, continuous, or current detailed I/O metrics of the specifics of certain I/O operations of an I/O request. Further, such detailed I/O metrics also provide the operator with the relationship among the I/O metrics, for example, the timer of a certain I/O operation indicates that it is causing delays to I/O operations performed in parallel or series. As one skilled in the art will recognize, I/O operations occurring in series correspond to I/O requests that are received in series at a storage volume 134, for example, a first I/O request is received, and, subsequently, a second I/O request is received.

Such detailed I/O metrics also indicate that a certain I/O path is congested because the subspan tracking the I/O response timer is often delayed. Such a system may allow a data center operator to evaluate the performance of I/O operations or I/O requests generally at various storage volumes 134, without necessitating the use of a cumbersome, overloaded protocol to communicate such statistics to client computing devices 150 or degrading the performance of network 120 if numerous I/O requests are sent to storage volume network 130. In one embodiment, an outlier is identified (e.g., because it falls below a performance threshold) as a slow performing arc, indicating to an operator of a data center that a change may be need to improve performance of the systems, or I/O requests generally.

Figure 2:
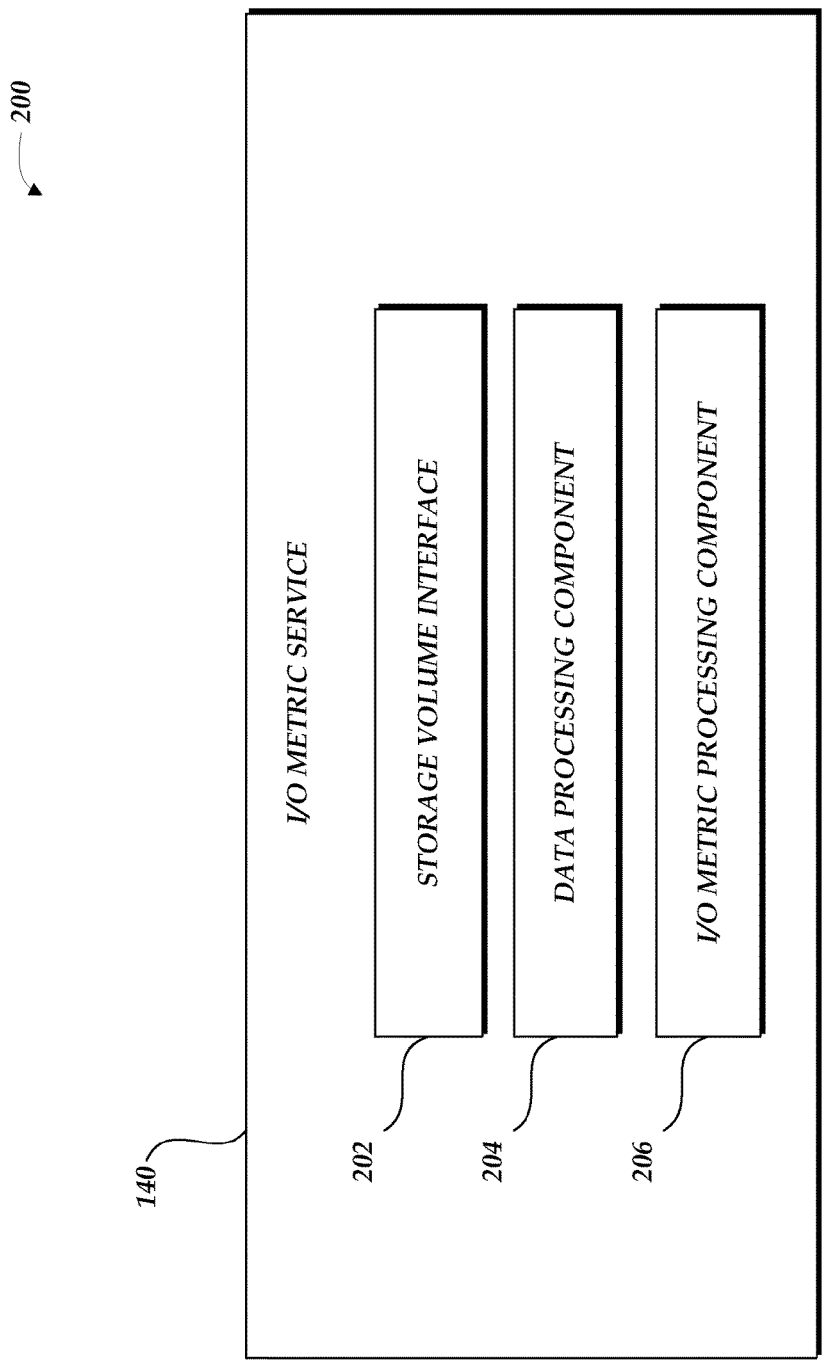
FIG. 2 is a block diagram depicting illustrative components of an I/O metric service included within the network topology of FIG. 1.

FIG. 2 is a block diagram depicting illustrative components of an I/O metric service 140 included within the network topology of FIG. 1. The I/O metric service 140 includes a storage volume interface 202 for receiving aggregated I/O metric information to be processed from the ring buffer. The I/O metric service 140 further includes the data processing component 204, which processes the aggregated I/O metric information into overall statistics. The I/O metric service 140 also includes an I/O metric processing component 206, which publishes the processed, aggregated I/O metric information (e.g., as overall statistics). In one embodiment, a data center operator of a data center network 102 can access these published statistics via the network 120.

Illustratively, the data processing component 204 and the I/O metric processing component 206 may include a number of hardware and software components. More specifically, the data processing component 204 and the I/O metric processing component 206 may include hardware, software, configuration data, data structures, computer-readable code, or any type of information that can be loaded into memory and processed or published by the data processing component 204 and the I/O metric processing component 206 respectively. Aspects of the data processing component 204 and the I/O metric processing component 206 will be described in further detail below with respect to FIG. 3B that illustrates the transmission of an I/O request and I/O metric aggregation. In various embodiments, reference to the I/O metric service 140 within the present disclosure may include multiple computing devices working in conjunction to facilitate the processing of aggregated I/O metric information and publishing of overall statistics. For example, in various embodiments, the I/O metric service 140 may be distributed through a network or implemented by one or more virtual machine instances.

The storage volume interface 202 may refer to a physical communication interface on a physical computing device. The storage volume interface 202 may be an electrical communication interface, an optical communication interface or other type of interconnect interface known in the art. The storage volume interface 202 may be configured to provide communications between units within the I/O metric service 140 (e.g., the I/O metric processing component 206) and the virtual machine instances 112 hosted on hosts 110. Illustratively, the configuration of the storage volume interface 202 may be optimized based on specific criteria, such as low latency, high speed, and high bandwidth, among others. In some embodiments, the interconnect interface may correspond to a high speed serial computer expansion bus, such as a Peripheral Component Interconnect Express (PCIe) bus. One skilled in the relevant art will appreciate that the storage volume interface 202 may incorporate alternative or additional standard interconnect interfaces well known to those skilled in the art. In some embodiments, the storage volume interface 202 includes a ring buffer or queue where aggregated I/O metrics sent from the storage volume network 130 may wait to be processed and published by the I/O metric service 140. In one embodiment, this aggregated I/O metric information is received via the storage volume interface 202 as a percentile distribution based at least in part on other similar I/O operations that have occurred on the same storage volume.

Figure 3A:
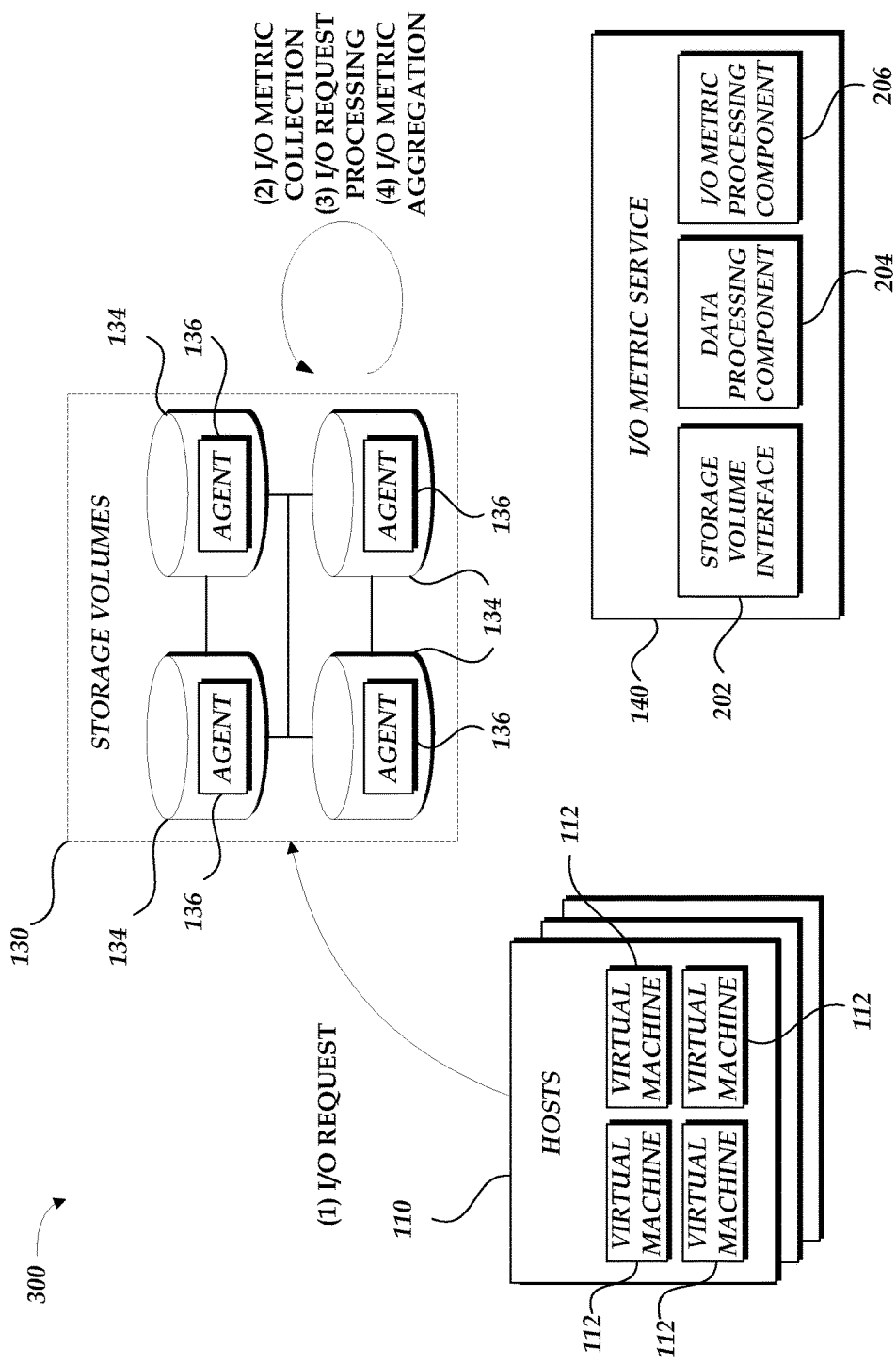
FIG. 3A is a block diagram of the network topology of FIG. 1 illustrating transmission of an I/O request and I/O metric aggregation.

FIG. 3A is a block diagram of the network topology of FIG. 1 illustrating transmission of an I/O request and I/O metric aggregation. At (1), a hosted virtual machine instance 112 transmits an I/O request to the storage volume network 130. An I/O request may be any request for a storage volume 134 that uses the storage resource in some way. For example, in one embodiment, the I/O request corresponds to a data backup I/O request, with a trace mapped to that I/O request; and I/O operations of that I/O request correspond to a read to a master storage volume and write to a slave storage volume, with spans mapped to those I/O operations. Using the same example, a subspan may be assigned to the latter span, which tracks a timer that measures the time to write to the slave storage volume. Another subspan may track another timer that measures the time to subsequently read to that same storage volume (e.g., perhaps to ensure that the write occurred and thus that the data backup actually occurred). Further, the I/O request includes relationship information. In the continued example from above, the write may have had to be performed prior to the read (because otherwise an operation checking that a write operation had occurred would be useless).

At (2), after an I/O request is received at storage volume network 130 (e.g., more specifically at a storage volume 134), the agents 136 begin I/O metric collection. The agents 136 store traces and spans in a buffer (e.g., a ring buffer). In some embodiments with large data processing, traces and spans are determined ahead of time, that is, the amount of data to be collected is preallocated in the buffer. For example, traces and spans are stored into a ring buffer. The size of the ring buffer determines the amount of data to be collected. The size of the ring buffers may be fixed or may be dynamic (e.g., with dynamic memory allocation). For example, in one embodiment, dynamic memory allocation may be used when a large amount of requests are not being transmitted via the network 120. In various other embodiments, static allocation may provide for a fixed size of the ring buffer, thereby allowing real-time collection of I/O metric information for numerous I/O requests.

In this approach of I/O requests processing, when a new I/O request is received at the storage volume 134, the ring buffer is searched for empty traces. Thus the ring buffer allows traces and spans to be reused for incoming I/O requests. One of the disadvantages avoided with this approach is that new traces and spans need not be created for each new I/O request. Instead, the same traces and spans can be reused for data aggregation. As described further with respect to aggregation, after aggregation, traces and associated spans and/or subspans are placed back into the ring buffer for the next I/O request.

During this I/O metric collection process, I/O requests are also associated with identifiers. That is, aspects of the present disclosure provide that traces, spans, and subspans represent the relationship between timers associated with spans or subspans, for example, timers that track I/O operations in parallel or in series (e.g., a processed read operation, and subsequently another read operation). In some embodiments, this can be I/O requests that indicate: replicating is to occur at another storage volume 134, loading data from the storage volume 134 is to occur, or even locking the storage volume 134 is to occur. For example, in many cases, replication occurs in parallel with a master storage volume 134 replicated at the slave storage volume 134 and, at the same, writing to the disk at the master storage volume 134. This relationship information can be encapsulated within a timer tracked by a span or several subspans. This allows I/O metrics of the timers to be tracked, for example, writing to disk at the master storage volume 134 may take longer than expected and thus have secondary effects on other timers of various storage volumes 134. In some embodiments, spans include start and end times for timers. In all, the spans and the subspans limited by the size of the ring buffer can be used to capture detailed I/O metric information associated with the spans and thereby used to evaluate the performance of the storage volumes 134 in real-time, near real-time, or continuously, so as to provide up-to-date information.

At (3), during the I/O metric collection, the I/O requests are processed by the agents 136. As part of this I/O processing, the agents 136 associate primary, secondary, and tertiary identifiers with the I/O requests; in some embodiments, these identifiers are referred to as traces, spans, and subspans. In various embodiments, a trace may contain metadata that informs the storage volume 134 of the various timers associated with the I/O request. Then, the trace is associated with any I/O operation that is related or associated to that particular I/O request. Further, any activity or I/O operation then associates with its own span—in essence a one-to-one mapping, although such a one-to-one mapping is not required. For example, a trace may represent a single I/O request, which may include a replication relationship. As an exemplary replication relationship, an I/O operation of the I/O request may be a read to the slave storage volume 134 and, in parallel, a write may be done to the master storage volume 134.

To further associate the I/O requests then, a trace is considered as a series of spans, where each span measures a particular I/O operation or component of the I/O request. In the same continued example, two spans represent the relationship of this master/slave replication: one span may include a timer that tracks the read the slave storage volume 134, while another span includes a timer that tracks the write to the master storage volume 134. Thus the agent 136 processes an I/O request (e.g., the write to the master storage volume) while traces and spans associated with the I/O request track the I/O requests and I/O operations respectively, and the various relationships among both the I/O requests and I/O operations. In some embodiments, this tracking of I/O requests corresponds to the I/O metric collection process.

Further regarding the I/O request processing, the agents 136 also associate subspans, for example, if a span is sending a message to the slave storage volume, then two subspans could also be associated with that message: one subspan may be processing at the slave storage volume and another subspan may be receiving a response from the slave storage volume at the master storage volume. In various embodiments, the agents 136 may associate I/O requests with spans and subspans. As another example, a write I/O request may have two spans tracking the write: a local write to a storage volume 134 and a remote write to another storage volume 134. With such detailed associations, once collected and aggregated, individual performance I/O metrics from the spans and subspans may be evaluated locally, for example, by an operator of storage volume network 130. Thus, an operator of the storage volume network 130 may obtain, based on the aggregated, individual performance I/O metrics, estimates of percentiles using histograms, binary heaps, or other approaches commonly understood by those skilled in the art. In some embodiments, such summary statistics are calculated and generated by the agents 136 as part of the generating the individual performance I/O metrics.

In some embodiments, the agents 136 associate spans and subspans with a particular I/O request that the agents 136 define based, in part, on that I/O request. Traces, spans, and subspans may use a self-describing format, which allows identification by other function calls or arguments based on that format. More specifically, the self-describing nature of a particular span (e.g., a global span) is that the span has a context associated with it. For example, other function calls and error arguments request the specific data associated with that global span, without necessitating a function call and error arguments to each subspan, each trace, or even each span. This may avoid some of the disadvantages of using a span with a single identification, namely, that numerous single identifications may be created for numerous I/O requests, overwhelming the I/O system. Further, with this approach, spans can be called by other processes and functions that are aware of the specific data that span has associated with it, for example, the time to write at a slave storage volume 134. Thus this approach allows the agents 136 or an operator of the storage volume network 130 to call/access only the spans or subspans with information that the agent 136 or the operator may be seeking. In contrast to a single identification system, the agent 136 or the operator may have to call several spans before it discovers the information that it is seeking. In various embodiments, a global identifier tracks all the associated traces, spans, and subspans associated by the agent 136.

After I/O metric processing, at (4), the agents 136 aggregate the I/O metric information collected by the spans and subspans (e.g., the various timers that spans and subspans use). In various embodiments, the agents 136 first perform aggregation across subspans, then spans, and, finally, traces. In other embodiments, the agent 136 of a master storage volume 134 aggregates all of the I/O metrics at the volume itself, along with the I/O metrics provided to it by a slave storage volume 134. In this embodiment, the master storage volume may immediately transmit I/O metric information to the I/O metric service 140. Similarly, a virtual machine instance may independently use the agent 136 to aggregate this I/O metric information and then transmit that aggregated I/O metric information to the I/O metric service 140. In various embodiments, the agents 136 aggregate I/O metrics more frequently (e.g., at one minute boundaries), for example, frequent aggregation occurs with numerous I/O requests to the storage volume network 130. Finally, the agents 136 then provide aggregated I/O metric information (e.g., a percentile distribution/construct) from the ring buffer and send for further processing at the centralized I/O metric processing service. In some embodiments, detailed I/O metric information can be provided with the percentile distribution, for example, the time of an I/O metric transmission event can be associated with a specific write to the slave storage volume 134. Further, in some embodiments, agents 136 may generate additional summary statistics, which may be used by an operator of a data center network 102 to identify outliers.

The illustrated transmission of an I/O request and I/O metric aggregation depicted in FIG. 3A can be used to collect and aggregate detailed I/O metric information, in part, by limiting the size of the ring buffer and increasing the frequency of aggregation for numerous I/O requests. In some embodiments, this approach may not overwhelm the network with the collection and aggregation of data. Because the ring buffer preallocates the traces and spans that collect data according to their dependent relationships, the network 120 may not be overwhelmed with the individual statistics collection that may exist in a client-centric statistical collection process. Further, this approach allows the agents 136 to collect and aggregate I/O metric information when most needed. That is, because I/O transmission events that are troublesome often degrade the performance of the network 120, I/O metric collection and aggregation may continue without further hindering that already-degraded network. Further still, because the ring buffer limits the amount of data to be collected, data collection and aggregation may occur without degrading the network 120.

Figure 3B:
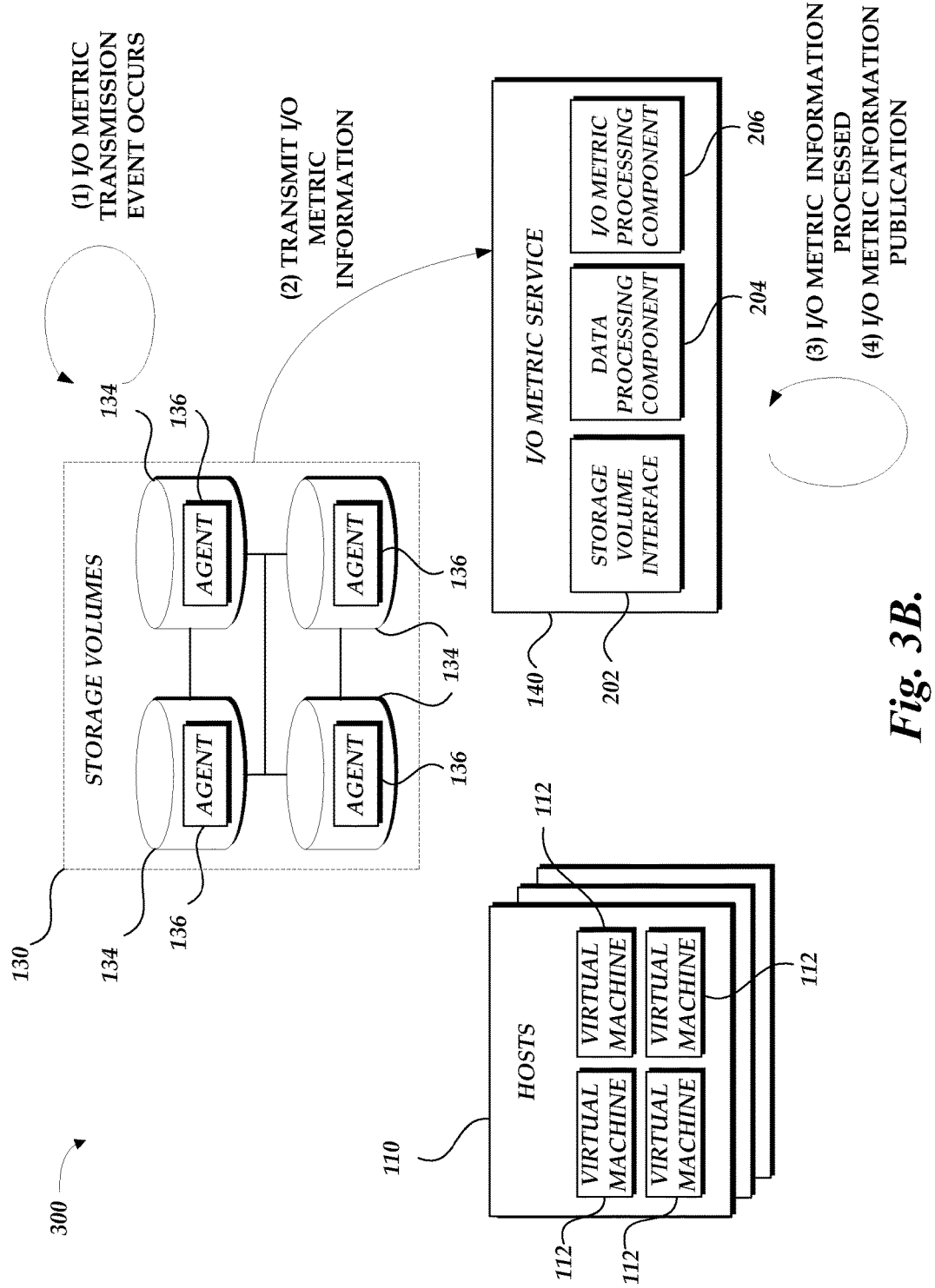
FIG. 3B is a block diagram the network topology of FIG. 1 illustrating an I/O metric transmission event, and processing of I/O metric information.

FIG. 3B is a block diagram of the network topology of FIG. 1 illustrating an I/O metric transmission event, processing of I/O metric information, and publishing I/O metric information as overall statistics. At (1), an I/O metric transmission event occurs at the storage volume network 130. For example, the agents 136 detect that I/O miss/failure has occurred, for example, a write I/O operation to the storage volume 134 has failed. When such events occur that cause performance degradation within the storage volume network 130, the agents 136 use spans and subspans to collect and aggregate detailed (e.g., fine granularity) I/O metric information. After collected and aggregated, these aggregated I/O metrics are stored in another ring buffer (e.g., a queue) awaiting transfer to the I/O metric service 140.

At (2), the storage volume network 130 transmits the aggregated I/O metric information to the I/O metric service 140. In various embodiments, one agent 136 may transmit such I/O metric information or several agents 136 may. In one embodiment, these aggregated I/O metrics are stored as percentile distributions (e.g., P95) in a queue within storage volume network 130, waiting for further processing at the I/O metric service 140. In one embodiment, another ring buffer may exist at the I/O metric service 140 acting as a queue for incoming aggregated I/O metrics sent from a ring buffer used by the agents 136.

Next, at (3), the data processing component 204 processes the aggregated I/O metric information received via the storage volume interface 202. In some embodiments, the data processing component 204 processes the aggregated I/O metric information if I/O requests become numerous so that real-time statistics are available to be published by the I/O metric processing component 206. In other embodiments as described above, the data processing component 204 processes the aggregated I/O metric information with respect to a certain entity perspective (i.e., from the perspective of a virtual machine instance 112). Or in other embodiments, the data processing component 204 may use the relationship information from the various identifiers used to collect and aggregate the data to provide statistics that relate various I/O operations with each other, various entities to each other, and/or a combination of these approaches.

Still referring to FIG. 3B, at (4), the I/O metric service 140 publishes the I/O metric information as statistics. Such statistics may be provided to various entities or operators. For example, the I/O metric processing component 206 publishes the statistics to a network or sends the statistics to a specific requesting entity (e.g., a client computing device 150 or a virtual machine instance 112). In other embodiments, a data center operator may access the I/O metric service 140 via the network 120 to request the published statistics from the I/O metric processing component 206. Or in various other embodiments, the I/O metric processing component 206 may publish the statistics directly to the storage volume network 130 or a specific storage volume 134 that may have been accessed locally by an operator. For example, a certain path to a slave storage volume may be performing slowly for several virtual machine instances at a hosted environment stored at an edge server compared to the server that is hosting the storage volumes. Because the edge server is located at a farther distance or routed differently, that particular I/O path may be performing a write or a read slowly to the slave storage volume. Thus the I/O metric service 140 is configured to provide statistics that allow a data center operator to evaluate which I/O operations or entities are slower performing, based on a performance threshold or various other quantitative approaches known to those of skill in the art.

Figure 4:
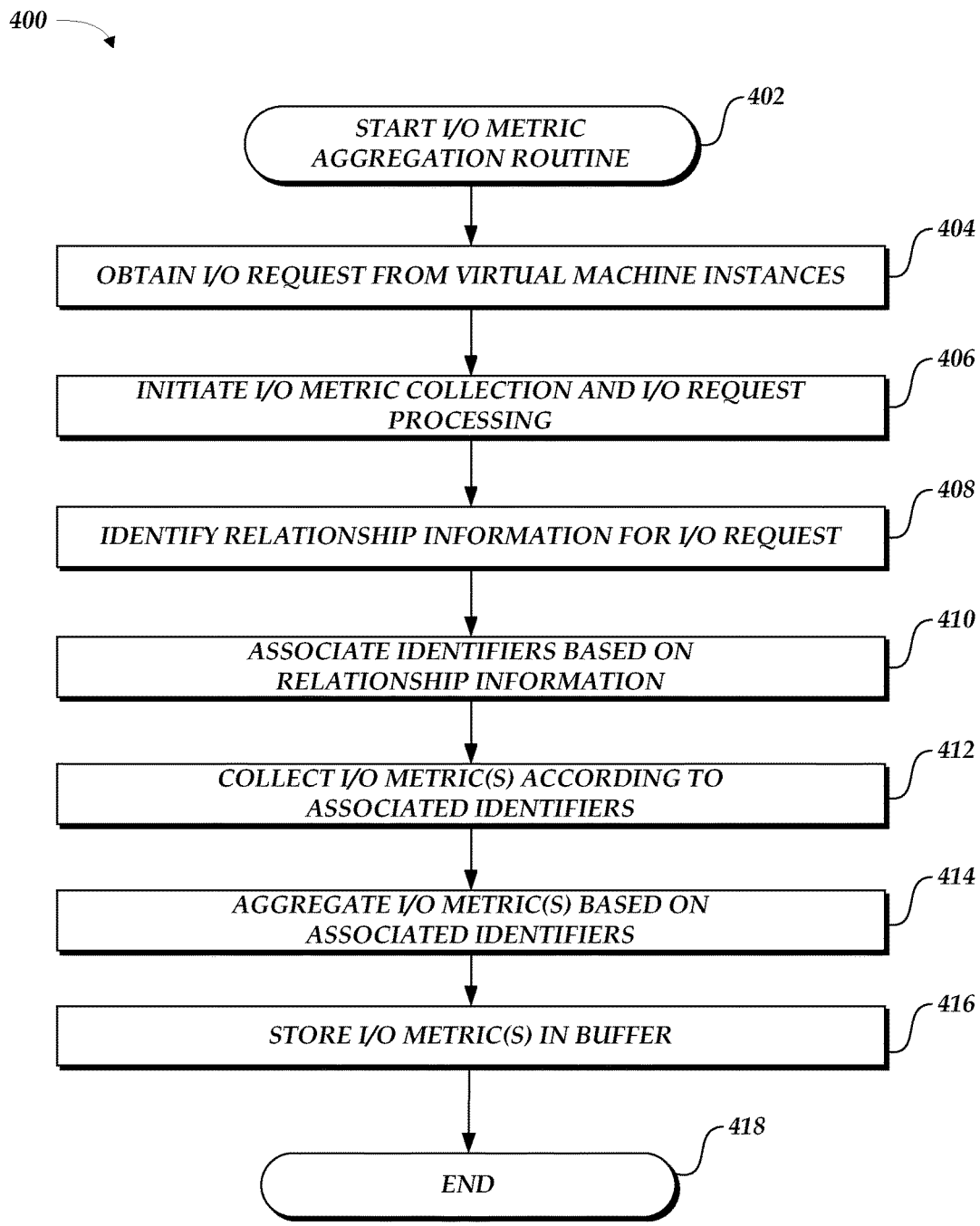
FIG. 4 is a flow diagram of an illustrative I/O metric aggregation routine implemented by a storage volume agent.

FIG. 4 is a flow diagram of an I/O metric aggregation routine 402 implemented by a storage volume agent. At block 404, an I/O request is obtained from virtual machine instances. For example, virtual machine instances send an I/O request to access storage information or resources from storage volumes. In one embodiment, the I/O request corresponds to a data backup I/O request. Next, at block 406, I/O request processing and collection is initiated. In some embodiments, a storage volume agent performs processing and collection in parallel. For example, blocks 408 and 410 (e.g., identifying relationship information and associating identifiers) may be performed in parallel to block 412 (e.g., collecting I/O metrics).

Next, at block 408, relationship information for the I/O request is identified. For example, this may be that obtaining storage resources from the storage volumes includes two I/O operations to be performed in series. In the data backup I/O request example, relationship information can indicate that two I/O operations of the data backup I/O are to be performed in parallel.

Continuing aggregation routine 402 at block 410, after one or more interdependent relationships have been identified, identifiers based on the relationship information are associated with the I/O request. For example, a trace may be associated with the I/O request as a one to one mapping. Further, spans may be associated with the particular I/O operations of that I/O request; that is, the spans are a subset of the trace.

Next, I/O metrics are collected according to the associated identifiers at block 412. For example, a span may include a timer that tracks (e.g. collects) a time associated with the I/O operation. In the same continued data backup I/O request example, spans are associated with two I/O operations: a read to a master storage volume and write to a slave storage volume, with timers tracked by the spans. Continuing in routine 402, at block 414, I/O metrics are aggregated based on their associated identifiers. For example, spans are first aggregated with their associated timers so that several I/O requests, having the same timers, are aggregated together across those I/O operations. This aggregation may provide a detailed I/O metric for that particular timer. Next still referring to block 414, aggregation may occur at the trace level. That is, several I/O requests may be aggregated together using their associated trace. Again, these aggregated traces may provide a detailed I/O metric. These detailed I/O metrics may then be used locally to evaluate the performance of the particular storage volume that performed the I/O request. At block 416, I/O metrics are then stored into a buffer. For example, in some embodiments the buffer is preallocated to store only a certain amount of I/O metrics that have been collected and aggregated by the associated identifiers. Thereafter, at block 418, routine 402 ends.

In various embodiments, routine 402 may be performed by an agent of an I/O metric processing service. In other embodiments, a physical computing device with computer-executable instructions may cause the computing device to perform routine 402. In some embodiments of the routine 402, elements may occur in sequences other than as described above. In such embodiments, the routine 402 may, for example, omit block 414. Accordingly, aggregated I/O metrics may be dynamically provided to an I/O metric service. One skilled in the art will appreciate that additional variations are possible and within the scope of the present disclosure.

All of the processes described herein may be embodied in, and fully automated via, software code modules executed by one or more general purpose computers or processors. The code modules may be stored in any type of computer-readable medium or other computer storage device. Some or all the methods may alternatively be embodied in specialized computer hardware. In addition, the components referred to herein may be implemented in hardware, software, firmware or a combination thereof.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
one or more client computing devices for transmitting input/output (I/O) requests via a communications network;
an I/O processing service, executed on one or more computing devices, the I/O processing service configured to:
obtain a first I/O request from a client computing device of the one or more client computing devices;
collect timer information associated with one or more I/O operations responsive to the first I/O request;
identify a dependency relationship of the first I/O request with a second I/O request obtained from the client computing device;
associate one or more identifiers based on the identified dependency relationship;
aggregate, using the associated one or more identifiers, the collected timer information to form aggregated I/O metric information; and
store the aggregated I/O metric information in a ring buffer based at least in part on at least one of the associated identifiers, the ring buffer specifying, at least in part, a maximum amount of aggregated I/O metric information to be collected; and
a centralized I/O metric processing service, executed on one or more computing devices configured to:
obtain, from the ring buffer, the aggregated I/O metric information;
process the aggregated I/O metric information; and
make accessible the processed aggregated I/O metric information.

2. The system of claim 1, wherein a length of the ring buffer is based at least in part on an amount of data to be aggregated by the I/O processing service.

3. The system of claim 1,
wherein the second I/O request corresponds to I/O operations occurring subsequent to the first I/O request at storage volumes performing the first and the second I/O requests.

4. The system of claim 1, wherein the one or more client computing devices correspond to virtual machine instances instantiated on one or more associated physical computing devices.

5. The system of claim 1, wherein the one or more identifiers includes a trace and a span, wherein the trace is defined based at least in part on identification information of the first I/O request, and the span is defined based at least in part on operations relating to the first I/O request.

6. A computer-implemented method comprising:
obtaining a first input/output (I/O) request from a client computing device;
identifying, based at least in part on the first I/O request, relationship information, the relationship information defining a dependency relationship between the first I/O request and a second I/O request of a set of I/O requests, wherein the second I/O request is obtained from the client computing device;
determining one or more primary identifiers and one or more secondary identifiers corresponding to the relationship information;
obtaining, using the determined one or more secondary identifiers, one or more timers associated with operations responsive to processing of the first I/O request;
aggregating, using the determined one or more primary identifiers and the determined one or more secondary identifiers, the one or more timers to form one or more metrics; and
storing the aggregated one or more metrics based at least in part on the one or more primary identifiers.

7. The computer-implemented method of claim 6, wherein the defined relationship between the first I/O request and the second I/O request indicates that the second I/O request includes operations to be performed in parallel to operations of the first I/O request, the computer-implemented method further comprising:
obtaining at least the second I/O request from the client computing device, wherein the at least the second I/O request and the first I/O request are in the set of I/O requests, and wherein the relationship information indicates that the set of I/O requests are to be performed in parallel.

8. The computer-implemented method of claim 6 further comprising:
determining one or more tertiary identifiers, the one or more tertiary identifiers based at least in part on the determined one or more primary identifiers and the determined one or more secondary identifiers;
obtaining metric information based at least in part on the first I/O request; and
aggregating, using the determined one or more tertiary identifiers, the metric information.

9. The computer-implemented method of claim 8, wherein the determined one or more primary identifiers are traces, the determined one or more secondary identifiers are spans, and the determined one or more tertiary identifiers are subspans.

10. The computer-implemented method of claim 6 further comprising:
obtaining data from the one or more secondary identifiers based at least in part on identification information of the one or more secondary identifiers, the identification information based at least in part on the first I/O request.

11. The computer-implemented method of claim 10 further comprising:
identifying, based at least in part on the obtained data about the first I/O request, one or more I/O requests that perform below a performance threshold.

12. The computer-implemented method of claim 11, wherein the performance threshold corresponds to a percentile.

13. The computer-implemented method of claim 6 further comprising:
obtaining the aggregated one or more metrics;
processing the aggregated one or more metrics; and
making accessible the processed aggregated one or metrics.

14. The computer-implemented method of claim 13 further comprising:
identifying one or more outliers.

15. The computer-implemented method of claim 6, wherein the set of I/O requests comprises one or more writes or one or more reads to storage volumes, and the relationship information indicates the relationship between the one or more writes or the one or more reads.

16. The method of claim 6, wherein storing the aggregated one or more metrics comprises storing the aggregated one or more metrics in a buffer.

17. A non-transitory computer-readable storage medium including computer-executable instructions comprising:

computer-executable instructions that, when executed by a computing device associated with one or more client computing devices:

obtain a first I/O request from a client computing device of the one or more client computing devices;

identify, based at least in part on the first I/O request, one or more relationships between the first I/O request and a second I/O request from the client computing device;

associate one or more primary identifiers and one or more secondary identifiers with at least one of the one or more relationships;

collect timer measurements responsive to the first I/O request;

aggregate, using at least the one or more primary identifiers, the collected timer measurements to form aggregated measurements; and store the aggregated measurements in a ring buffer based at least in part on the one or more primary identifiers, the ring buffer defining a maximum amount of metric data to be collected.

18. The non-transitory computer-readable storage medium of claim 17 further comprising:

additional computer-executable instructions that, when executed,
obtain the aggregated measurements;
process the aggregated measurements; and
make accessible the processed aggregated measurements.

19. The non-transitory computer-readable storage medium of claim 17, wherein the first I/O request is a read operation to a storage volume, and the second I/O request is related to the read operation, the second I/O request performed in parallel to the first I/O request by the computing device.

20. The non-transitory computer-readable storage medium of claim 18, wherein the computer-executable instructions include further computer-executable instructions that, when executed,
identify one or more outliers of the processed aggregated measurements.

21. The non-transitory computer-readable storage medium of claim 18, wherein the first I/O request is received by a storage volume that stores data for the client computing device.

22. The non-transitory computer-readable storage medium of claim 18, wherein the one or more primary identifiers include traces that identify timers, and wherein the timers track replication of the first I/O request at another storage volume.

23. The non-transitory computer-readable storage medium of claim 18, wherein one of the identified one or more relationships is a dependency of a storage volume when waiting for another storage volume to process a replication of the first I/O request.

* * * * *